Oct. 22, 1968  O. RAMSTETTER ET AL  3,407,370
MAGNETICALLY OPERATED SWITCH HAVING OPPOSED PLURAL MAGNETS
Filed Dec. 27, 1966  2 Sheets-Sheet 2
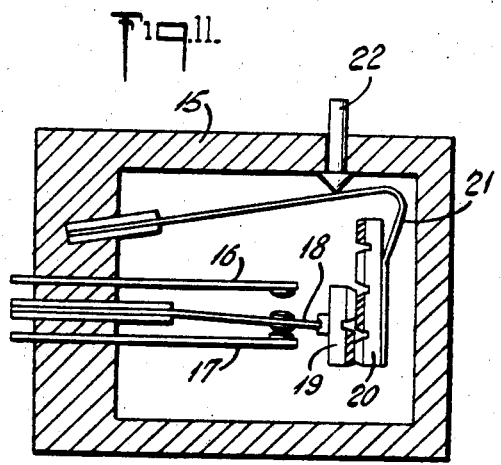
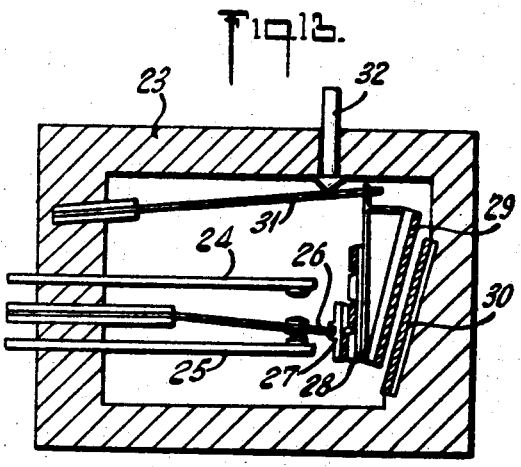
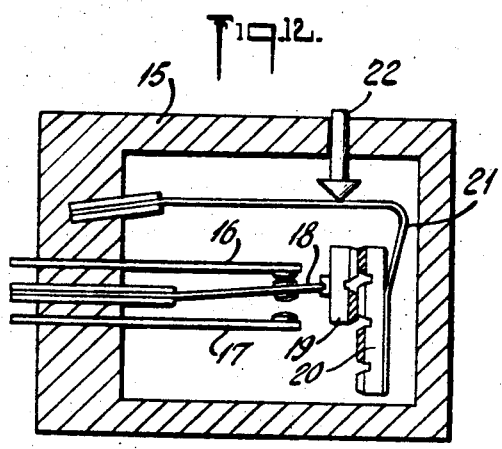
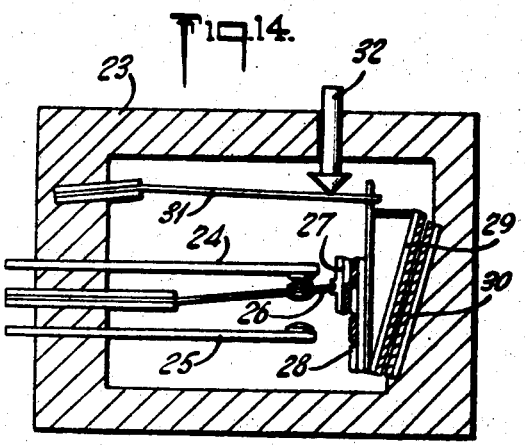
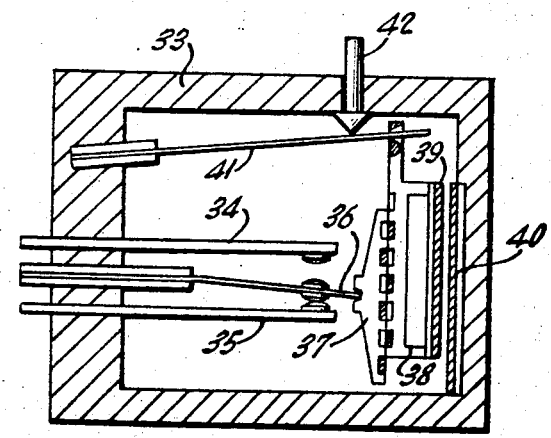
INVENTORS
OTTO RAMSTETTER
NIKO FAST
BY
ATTORNEYS

United States Patent Office 3,407,370
Patented Oct. 22, 1968

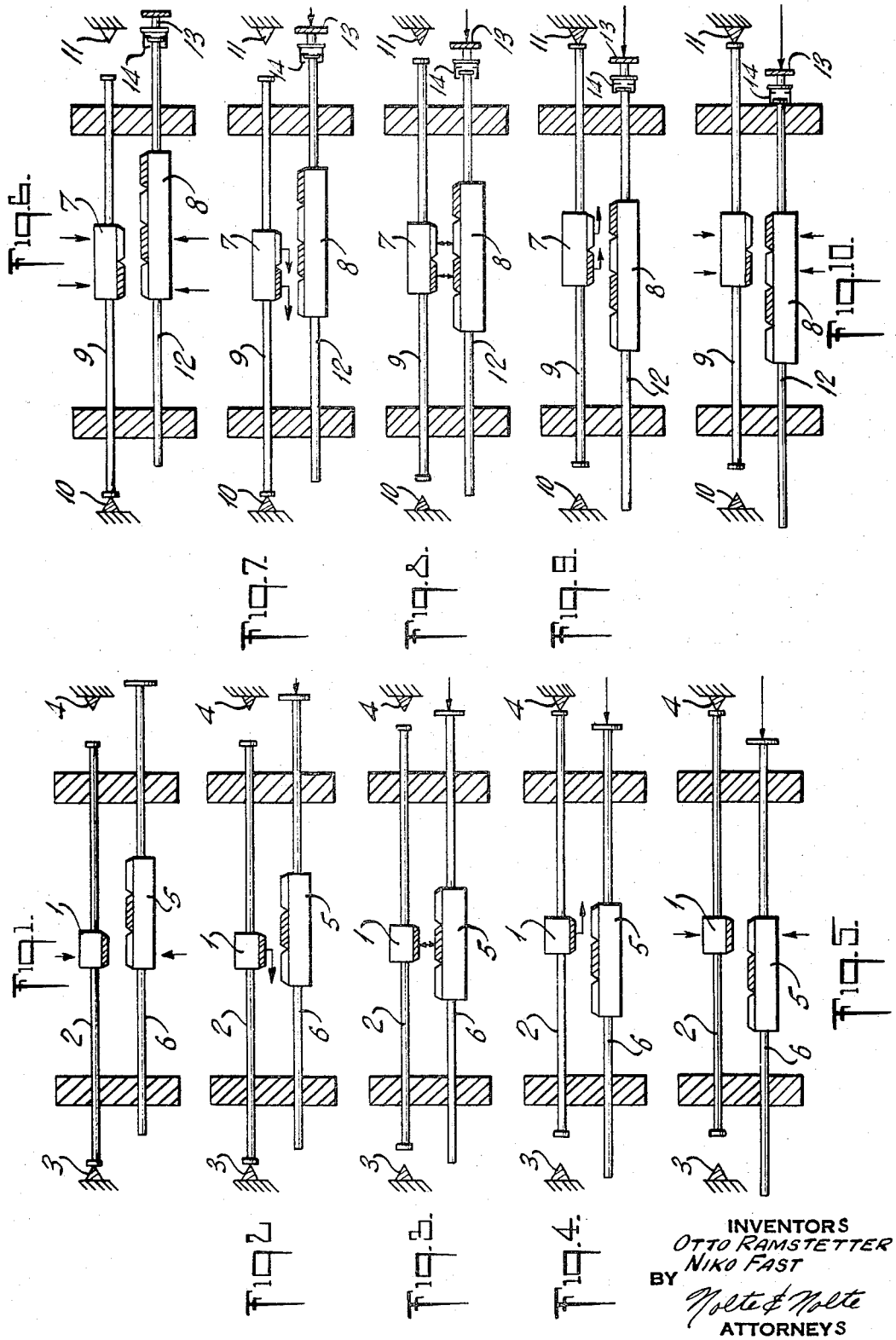

3,407,370
MAGNETICALLY OPERATED SWITCH HAVING
OPPOSED PLURAL MAGNETS
Otto Ramstetter, Prinzeneiche 22, Starnberg, Germany,
and Niko Fast, Bensberg, Germany; said Fast assignor
to said Ramstetter
Filed Dec. 27, 1966, Ser. No. 604,758
Claims priority, application Germany, Dec. 31, 1965,
F 48,068; Aug. 18, 1966, R 43,944
15 Claims. (Cl. 335—206)

ABSTRACT OF THE DISCLOSURE

The switching part of a magnetically operated switch device is movably mounted to make electrical contact with one of a pair of spaced electrical contacts in one switching position and to make electrical contact with the other of the electrical contacts in another switching position. A permanent switching magnet is affixed to the switching part. A permanent operating magnet is affixed, in operative proximity with the switching magnet, to an operating part which is movably mounted for movement in a direction substantially parallel to the direction of movement of the switching part. Each of the switching and operating magnets has a plurality of magnetic poles of alternating polarities linearly positioned in adjacent relationship in the direction of movement of its supporting part. The operating magnet has two more poles than the switching magnet. The magnetic poles of the switching and operating magnets face each other. The magnetic poles at one end of one of the magnets and at the corresponding end of the other of the magnets are of opposite polarity and the magnetic poles at the other end of one of the magnets and at the corresponding end of the other of the magnets are of opposite polarity.

BACKGROUND OF THE INVENTION

A. Field of the invention

The present invention relates to a magnetically operated device. More particularly, the invention relates to a magnetically operated electrical switch device. The switch device of the present invention comprises a switching part having a permanent magnet and an operating part, movable in the switching direction, and having another permanent magnet, the operating part magnet cooperating with the switching part magnet.

B. Description of the prior art

Magnetically operated electric switches of various designs are disclosed in German Patent Nos. 1,077,750; 1,114,886; 1,125,032; 1,143,565; 1,149,779; 1,169,000 and DBGM 1,892,294, as well as in United States Patent No. 2,520,935. In each of these known switch devices, it is either the repelling force between permanent magnets or the attractive force between a magnet and a soft-iron part which is utilized. When the repelling forces are utilized, practically the same mechanical effect is achieved as is obtained with customary switches operating with a mechanical catch effect. Switches which utilize a magnetic attractive force are usually enclosed switches, and the magnetic operation influences the switch contacts which are positioned in glass tubes or the like. None of the know switch devices of this type is superior to a purely mechanical switch with respect to switching characteristics; that is, with respect to safe and secure electrical contact of the contacts with each other, as well as with respect to a very rapid and exact change of the switching position, without relatively long time delay, at only very slight contact pressure.

SUMMARY OF THE INVENTION

The principal object of the present invention is to provide a new and improved magnetically operated switch device, and, more specifically, a new and improved magnetically operated electrical switch device. The switch device of the present invention maintains the closed contact electrical contact pressures in each case to a large extent until a sudden switching action occurs. When a sudden switching action occurs, the switching device of the present invention again provides and maintains a sufficient closed contact electrical contact pressure from the instant of the initial electrical contact. The switch device of the present invention is of simple structure, but operates with efficiency, effectiveness and reliability.

In accordance with the present invention, the magnetically operated switch device comprises a switching part having a permanent switching magnet affixed thereto. The switching magnet has one or more alternate magnetic poles, linearly positioned in adjacent relationship in the direction of movement of the switching part. An operating part has a permanent operating magnet affixed thereto. The operating magnet has a plurality of alternate magnetic poles linearly positioned in adjacent relationship in the direction of movement of the operating part. The operating magnet has two more magnetic poles than the switching magnet. The switching magnet and the operating magnet are spaced from each other in an embodiment of the switch device of the present invention. The magnetic poles of the switching magnet and the operating magnet are so positioned that at one end of one of said magnets and at the corresponding end of the other of said magnets said magnet poles are of opposite polarity and at the other end of one of said magnets and at the corresponding end of the other of said magnets said magnet poles are of opposite polarity.

The switching device of the present invention utilizes the repelling forces of the cooperating switching and operating magnets as well as their attractive forces. When the switch device is in neutral or initial position, the contact pressure, which in each case causes the contact to be closed, may be supported by the forces of attraction between the operating magnet and the switching magnet. Upon an initial movement of the operating magnet, or when such movement commences, repelling forces occur between said operating magnet and the switching magnet, and such repelling forces maintain the contact pressure. At the point of reversal of the switching action, magnetic poles of the same polarity face each other, so that repelling forces occur and suddenly move the switching magnet after overcoming the unstable condition of the switch device at said point of reversal. During the switching movement of the switching magnet, and toward the end of such switching movement, forces of attraction occur between the magnetic poles of opposite polarity which then face each other. The attractive forces cause rapid closing of the contact and maintain the contact in closed position.

The individual poles of the switching magnet as well as of the operating magnet may be positioned approximately the same distance from each other in the switching direction. The pole pitch may be smaller than or equal to the switching path to the contact which is to be electrically contact. The stroke of the operating magnet may in this connection be longer than half the stroke of the switching magnet. The stroke of the operating magnet may, however, be shorter than twice the stroke of the switching magnet.

In order to secure the perfect operation of the switching device of the present invention, a stop or spacer, which limits the stroke of the operating magnet, is so positioned that there is an attractive force between the operating magnet and the switching magnet when said switching magnet is in either of its two switching positions, said attractive force supporting the contact pressure. This effect is obtained if the poles of the operating magnet are, in each case, displaced slightly in a direction toward the closed contact opposite the facing opposite poles of the switching magnet, so that attractive forces act in the direction of such contact.

In another embodiment of the switch device of the present invention, the operating magnet glides or slides directly on the switching magnet. In order to prevent the operating and switching magnets from sticking to each other and to prevent undesirable abrasions of the magnet material, each of said operating and switching magnets may be provided on their facing surfaces with a coat of a plastic material having good gliding or sliding properties. In order to provide perfect gliding or sliding movement of the operating and switching magnets on each other, the operating magnet may be arranged to be movable toward the switching magnet, so that said operating magnet may adjust exactly to said switching magnet. Furthermore, the switching magnet may be arranged to be movable toward the operating magnet. An especially desirable switching movement is provided when the operating and switching magnets are maintained in abutting relationship with each other by a slight force. This can be achieved by mounting the operating magnet on a leaf spring which is movable at approximately right angles to the direction of the switching movement. The leaf spring provides a slight backing force toward the switching magnet. The backing force provided by the leaf spring should be of a magnitude which permits the operating and switching magnets to separate from each other as soon as their poles of the same polarity face each other to produce a repelling force between them. The additional backing force may also be provided by affixing a backing magnet to the side of the operating magnet facing away from the switching magnet. A co-operating backing magnet of the same polarity as the backing magnet is fixedly positioned for cooperating with said backing magnet, so that there is a repelling force between said backing magnet and said cooperating backing magnet. The repelling force between the backing magnet and the cooperating backing magnet has a magnitude which permits the operating and the switching magnets to separate from each other as soon as their poles of the same polarity face each other. An additional return force for the operating magnet, or a force which counteracts the operating force, may be provided by providing an air gap between the backing magnet and the cooperating backing magnet which is at an angle with the direction of switching movement of the operating magnet. The angularly positioned or inclined air gap varies during the switching movement, thereby varying the space between the backing and the cooperating backing magnets to increase the repelling force.

The operating magnet with the backing magnet affixed thereto may be mounted for movement on and with an operating lever, so that it may freely adjust itself with regard to the contacting surfaces of the operating and switching magnets and at right angles to said contacting surfaces. A mechanical guide member or device or magnetic forces may be utilized to prevent the operating magnet with the backing magnet affixed thereto from moving out from between the cooperating backing magnet and the switching magnet.

The operating magnet and the backing magnet are advantageously made from an integral piece of magnetizable material which is suitably magnetized.

In order to keep the range of flow contact pressure, which is unavoidable during the switching operation, as limited or small as possible, the operating magnet may be mounted for free movement to a limited extent in the operating direction and with respect to the operating lever on which said operating magnet is mounted. In this manner, the operating magnet may deviate to a limited extent and in the switching direction relative to the switching magnet, that is, at the instant that the switching movement of said switching magnet commences, so that greater repelling forces act immediately on the switching magnet to accelerate the switching operation. The limitations to the free movement of the operating magnet depend upon the dimensions of the switch device, and must be adjusted to such dimensions.

In acordance with the present invention, a magnetically operated switch device comprises a pair of electrical contacts spaced from each other. A switching part is movably mounted to make electrical contact with one of the electrical contacts in one switching position and to make electrical contact with the other of the electrical contacts in another switching position. A permanent switching magnet is affixed to the switching part and has a plurality of magnetic poles of alternating polarities linearly positioned in adjacent relationship in the direction of movement of the switching part. An operating part is movably mounted for movement in a direction substantially parallel to the direction of movement of the switching part. A permanent operating magnet is affixed to the operating part in operative proximity with the switching magnet and has a plurality of magnetic poles of alternating polarities linearly positioned in adjacent relationship in the direction of movement of the operating part, the number of magnetic poles of the operating magnet being two more than the number of magnetic poles of the switching magnet. The magnetic poles at one end of one of the magnets and at the corresponding end of the other of the magnets are of opposite polarity and the magnetic poles at the other end of one of the magnets and at the corresponding end of the other of the magnets are of opposite polarity. The magnetic poles of the switching magnet and the magnetic poles of the operating magnet face each other. The magnetic poles of the switching magnet and the magnetic poles of the operating magnet are spaced approximately the same distance from each other in their directions of movement. The switching part is moved to one of the electrical contacts over a switching path via magnetic forces between the operating magnet and the switching magnet and each of the magnetic poles has a pitch which at its maximum is equal to the switching path. The switching magnet moves with the switching part and the operating magnet moves with the operating part a distance which is larger than half the distance moved by the switching magnet but shorter than twice the distance moved by the switching magnet.

The switching part is moved to one of the electrical contacts over a switching path via magnetic forces between the operating magnet and the switching magnet. A stop may be affixed to the operating part for limiting the movement of the operating magnet in a manner whereby there is an attractive force between the operating magnet and the switching magnet when the switching magnet is in either of its switching positions and the attractive force supports the electrical contact pressure.

In one embodiment of the magnetically operated switch device of the present invention, the switching magnet and the operating magnet are spaced from each other. In another embodiment of the switch device of the present invention, the operating magnet and the switching magnet are in abutting relation and the operating magnet slides on the switching magnet. Plastic material having a low coefficient of friction coats the facing surfaces of each of the magnets. A support supports the operating magnet for movement toward the switching magnet. The support comprises a leaf spring permitting movement of the operating magnet in the direction of movement of the switching magnet. The operating magnet may be mounted for movement along the leaf spring. A backing magnet is affixed to the side of the operating magnet facing away from the switching magnet. A cooperating backing magnet having the same polarity as the backing magnet is fixedly mounted in operative proximity with the backing magnet. An air gap of substantially uniform width is provided between the backing magnet and the cooperating backing magnet. Each of the backing magnet, the cooperating backing magnet and the air gap are inclined at an angle with the direction of movement of the operating magnet. The angle of inclination is the same for the magnets and the air gap. The operating magnet and the backing magnet may be integrally formed in an integral unit. The magnetic poles of each of the switching magnet and the operating magnet are tapered to form substantially V-shaped spaces between adjacent ones of the magnetic poles.

BRIEF DESCRIPTION OF THE DRAWINGS

In order that the present invention may be readily carried into effect, it will now be described with reference to the accompanying drawings, wherein:

FIGS. 1 to 5 are schematic diagrams, partly in section, showing different phases of operation of an embodiment of the switch device of the present invention;

FIGS. 6 to 10 are schematic diagrams, partly in section, showing different phases of operation of a modification of the embodiment of FIGS. 1 to 5;

FIGS. 11 and 12 are schematic diagrams, partly in section, showing different phases of operation of another embodiment of the switch device of the present invention;

FIGS. 13 and 14 are schematic diagrams, partly in section, showing different phases of operation of a modification of the embodiment of FIGS. 11 and 12; and FIG. 15 is a schematic diagram, partly in section, of another modification of the embodiment of FIGS. 11 and 12.

DESCRIPTION OF THE PREFERRED EMBODIMENTS

In the figures, in order to distinguish between north and south magnetic poles, one of such poles such as, for example, the north pole, is shown cross-hatched.

The embodiment of the magnetically operated switch device of the present invention, shown in FIGS. 1 to 5, comprises a permanent switching magnet 1 having a single magnet pole of north polarity mounted on a switching part 2. The switching part 2 is mounted for movement in directions along its axis, back and forth between an electrical contact 3 an and electrical contact 4 under the control of the switching magnet 1.

A permanent operating magnet 5 has three magnet poles of alternating polarities mounted on an operating part 6. Since there is only a single north pole of the switching magnet 1, the magnet pole at one end of the operating magnet 5 is a south pole and the magnet pole at the other end of said operating magnet is also a south pole. The magnet pole intermediate the south poles of the operating magnet 5 is a north pole. The operating part 6 is mounted for movement in directions along its axis, parallel to the movement of the switching part 2, back and forth under manual or other force applied to an end thereof.

In FIG. 1, the switch device is in one of its switching positions in which the switching part 2 is in electrical contact with the electrical contact 3. In such one switching position of the switching device, there are attractive forces between the switching magnet 1 and the operating magnet 5.

In FIG. 2, the operating part 6 is axially displaced further toward the left or toward the electrical contact 3, and there is an attractive force in the direction of said electrical contact 3 between the operating magnet 5 and the switching magnet 1.

In FIG. 3, the operating magnet 5 is displaced even further toward the electrical contact 3 and is directly opposite the switching magnet 1. FIG. 3 illustrates the position of the switch device at the point of reversal of the switching action. At such point of reversal, the switching part 2 is mid-way between the electrical contacts 3 and 4 and is not in electrical contact with either of said electrical contacts. At the point of reversal of the switching action, there is a repelling force between the switching magnet 1 and the center magnetic pole of the operating magnet 5.

In the switching position shown in FIG. 4, the switching part 2 is in electrical contact with the electrical contact 4. The repelling force between the north poles of the operating and switching magnets at the point of reversal of the switching action, as shown in FIG. 3, is overcome and the switching part 2 is rapidly moved into electrical contact with the electrical contact 4. This switching operation thus positions the switch device in the other of its switching positions with the assistance of an attractive force between the switching magnet 1 and the south pole at the right end or the end closest the electrical contact 4 of the operating magnet 5.

If the operating part 6 remains in its position shown in FIG. 4, due to the operation of a stop device or the like, the attractive force between the operating and switching magnets maintains the electrical contact between the switching part 2 and the electrical contact 4. In such case, a mechanical support for the electrical contact 4 is unnecessary.

In FIG. 5, the operating part 6 is displaced or moved still further to the left to the extent that the north magnetic pole of the switching magnet 1 faces the south magnetic pole at the right end of the operating magnet 5, so that magnetic poles of opposite polarities face each other in the switching position illustrated in FIG. 1 and in the switching position illustrated in FIG. 5. The switching position of FIGS. 1 and 2 is the same and the switching position of FIGS. 4 and 5 is the same.

The modification of the magnetically operated switch device of the present invention, shown in FIGS. 6 to 10, comprises a permanent switching magnet 7 having two magnetic poles of opposite polarity mounted on a switching part 9. The switching part 9 is mounted for movement in directions along its axis back and forth between an electrical contact 10 and an electrical contact 11 under the control of the switching magnet 7.

A permanent operating magnet 8 has four magnetic poles of alternating polarities mounted on an operating part 12. The magnetic pole at the left end of the switching magnet 7 is a north pole and the magnetic pole at the corresponding left end of the operating magnet 8 is a south pole. The magnetic pole at the right end of the switching magnet 7 is a south pole and the magnetic pole at the corresponding right end of the operating magnet 8 is a north pole.

The operating part 12 is mounted for movement in directions along its axis, parallel to the movement of the switching part 7, back and forth under manual or other force applied to an end thereof. The force for moving the operating part 12 may be applied to a knob, handle, or the like, 13, affixed to an end of said operating part. A stop, spacer, or the like, 14, is affixed to the operating part 12 a short distance from the knob 13 and limits the axial movement of said operating part.

The switching positions shown in FIGS. 1, 2, 3, 4 and 5 correspond to, and are the same as, the switching positions shown in FIGS. 6, 7, 8, 9 and 10, respectively. In FIG. 6, the north and south magnetic poles of the switching magnet 7 face the south and north magnetic poles, respectively, at the left end of the operating magnet 8. There is thus an attractive force between the operating and switching magnets.

In FIG. 7, the operating magnet 8 is moved along the axis of the operating part 12 toward the left or toward the electrical contact 10. The attractive forces are thus in the direction toward the electrical contact 10 and are assisted or supported by repelling forces between the magnetic poles of the same polarity.

In FIG. 8, the switch device is at the point of reversal of the switching action. At such point of reversal, the switching part 9 is mid-way between the electrical contacts 10 and 11 and is not in electrical contact with either of said electrical contacts. The switching magnet 7 is directly opposite the operating magnet 8 with the north and south poles of said switching magnet facing the intermediate north and south poles, respectively, of said operating magnet. The repelling force between the switching and operating magnets is thus increased and assists the switching operation.

In FIG. 9, the switch device is in its other switching position, with the switching part 9 in electrical contact with the electrical contact 11. Both attractive and repelling forces act between the switching magnet 7 and the operating magnet 8 in the direction toward the electrical contact 11.

The stop or spacer 14 on the operating part 12 limits the movement of said operating part to the left, as shown in FIG. 10. In FIG. 10, as in FIG. 9, the switch device is in its other switching position, and there are attractive forces between the magnetic poles of opposite polarity which face each other. The stop 14 prevents the operating part 12 from moving further to the left than its other switching position.

FIGS. 11 and 12 show another embodiment of the switch device of the present invention. In FIGS. 11 and 12, a switching device 15 comprises a pair of spaced fixed electrical contacts 16 and 17. A movable switching part 18 is positioned between the electrical contacts 16 and 17 and comprises a leaf spring.

A switching magnet 19 is mounted on the free end of the switching part 18 and has a north pole and a south pole. An operating magnet 20 is mounted on a support part 21 which comprises a leaf spring. The operating magnet 20 has four poles of alternating polarities and cooperates with the switching magnet 19. The support part 21 applies a slight force on the operating magnet 20 toward the switching magnet 19. The switch device is operated by a manual or other force applied to the support part 21 via a pin or prong 22.

The poles of each of the switching magnet 19 and the operating magnet 20 are tapered at their adjacent edges so that the cross-section of each pole is a rhombus and a substantially U-shaped or V-shaped separation is formed between adjacent poles.

In FIG. 11, the switch device is in one of its switching positions in which the switching part 18 is in electrical contact with the electrical contact 17; there being no force applied to the pin 22. In FIG. 12, the switch device is in the other of its switching positions in which the switching part 18 is in electrical contact with the electrical contact 16; there being a force applied to the pin 22 in an axial downward direction. The operating magnet 20 and the switching magnet 19 slide or glide on each other in a direction substantially parallel to the axis of the pin 22. The abutting surfaces of the switching and operating magnets are preferably coated with plastic material having a low coefficient of friction to facilitate the movement of the operating magnet and to prevent abrasion of said abutting surfaces.

FIGS. 13 and 14 show a modification of the switch device of FIGS. 11 and 12. In FIGS. 13 and 14, a switch device 23 comprises a pair of spaced fixed electrical contacts 24 and 25. A movable switching part 26 is positioned between the electrical contacts 24 and 25 and comprises a leaf spring.

A switching magnet 27 is mounted on the free end of the switching part 26 and has a north pole and a south pole. An operating magnet 28 is mounted on a support part 31 which comprises a leaf spring. The operating magnet 28 has four poles of alternating polarities and cooperates with the switching magnet 27. The operating magnet 28 slides or glides on the switching magnet 27 in a direction substantially parallel to the axis of a spin or prong 32. The abutting surfaces of the switching and operating magnets are preferably coated with plastic material having a low coefficient of friction to facilitate the movement of the operating magnet and to prevent abrasion of said abutting surfaces. The support part 31 applies a slight force on the operating magnet 28 toward the switching magnet 27. The switch device is operated by a manual or other force applied to the support part 31 via the pin 32.

A backing or contact force is provided by a backing magnet 29 affixed to the side of the operating magnet 28 facing away from the switching magnet 27 and a cooperating backing magnet 30 fixedly mounted in the housing of the switch device 23 in operative proximity with the backing magnet. The backing magnet 29 and the cooperating backing magnet 30 are of the same polarity and are spaced from each other by an air gap of substantially uniform width. The combined operating magnet 28 and backing magnet 29, which may be an integral unit, is movable in position along the support part 31.

The air gap between the backing magnet 29 and the cooperating backing magnet 30 is inclined to or at an angle with the direction of movement of the operating magnet 28. The angle of inclination of the air gap is such that, as the operating magnet 28 is moved downward, said air gap decreases and the repelling forces between the backing magnet 29 and the coopearting backing magnet 30 increases.

The poles of each of the switching magnet 27 and the operating magnet 28 are tapered at their adjacent edges so that the cross-section of each pole is a rhombus and a substantially V-shaped separation is formed between adjacent poles. The backing magnet 29 and the cooperating backing magnet 30 are inclined at the same angle as the air gap between them with the direction of movement of the operating magnet 28.

In FIG. 13, the switch device is in one of its switching positions in which the switching part 26 is in electrical contact with the electrical contact 25; there being no force applied to the pin 32. In FIG. 14, the switch device is in the other of its switching positions in which the switching part 26 is in electrical contact with the electrical contact 24; there being a force applied to the pin 32 in an axial downward direction.

FIG. 15 shows a modification of the switch device of FIGS. 11 and 12. In FIG. 15, a switch device 33 comprises a pair of spaced fixed electrical contacts 34 and 35. A movable switching part 36 is positioned between the electrical contacts 34 and 35 and comprises a leaf spring. A switching magnet 37 is mounted on the free end of the switching part 36 and has six magnetic poles of alternating polarities. An operating magnet 38 slides or glides on the switching magnet 37 in a direction substantially parallel to the axis of a pin or prong 42. The operating magnet 38 has six magnetic poles of alternating polarities.

A backing magnet 39 is affixed to the surface of the operating magnet 38 which faces away from the switching magnet 37. The backing magnet 39 is positioned in operative proximity with a cooperating backing magnet 40 of the same polarity spaced therefrom by an air gap of substantially uniform width. The cooperating backing magnet 40 is fixedly mounted in the housing of the switch device 33. The air gap between the backing and cooperating backing magnets extends in a direction parallel to the movement of the operating magnet 38 and therefore the switching movement. The operating magnet 38 is supported by a support part or operating lever 41 which may comprise a leaf spring and which is moved by the pin 42.

The operating magnet 38 is mounted for free movement to a limited extent in the operating direction and with respect to the operating lever 41, on which said operating magnet is mounted. This maintains the range of low contact pressure as small as possible. The operating magnet 38 may thus deviate to a limited extent and in the switching direction relative to the switching magnet 37 at the instant that the switching movement of said switching magnet commences, so that greater repelling forces act immediately on said switching magnet to accelerate the switching operation.

The modification of FIG. 15 is suitable only for relatively short switching movements, due to the relatively narrow or close magnetic poles of the switching and operating magnets 37 and 38. The relatively large size or dimensions of the switching magnet 37 is a disadvantage.

While the invention has been described by means of specific examples and in specific embodiments, we do not wish to be limited thereto, for obvious modifications will occur to those skilled in the art without departing from the spirit and scope of the invention.

What we claim is:

1. A magnetically operated switch device comprising
   a pair of electrical contacts spaced from each other;
   a switching part movably mounted to make electrical contact with one of said electrical contacts in one switching position and to make electrical contact with the other of said electrical contacts in another switching position;
   a permanent switching magnet affixed to said switching part and having a plurality of magnetic poles of alternating polarities linearly positioned in adjacent relationship in the direction of movement of said switching part;
   an operating part movably mounted for movement in a direction substantially parallel to the direction of movement of said switching part; and
   a permanent operating magnet affixed to said operating part in operative proximity with said switching magnet and having a plurality of magnetic poles of alternating polarities linearly positioned in adjacent relationship in the direction of movement of said operating part, the number of magnetic poles of said operating magnet being two more than the number of magnetic poles of said switching magnet, said magnetic poles at one end of one of said magnets and at the corresponding end of the other of said magnets being of opposite polarity and said magnetic poles at the other end of one of said magnets and at the corresponding end of the other of said magnets being of opposite polarity, the magnetic poles of said switching magnet and the magnetic poles of said operating magnet facing each other.

2. A magnetically operated switch device as claimed in claim 1, wherein the magnetic poles of the switching magnet and the magnetic poles of the operating magnet are spaced approximately the same distance from each other in their directions of movement.

3. A magnetically operated switch device as claimed in claim 1, wherein said switching part is moved to one of said electrical contacts over a switching path via magnetic forces between said operating magnet and said switching magnet, each of said magnetic poles having a pitch which at its maximum is equal to said switching path.

4. A magnetically operated switch device as claimed in claim 1, wherein said switching magnet moves with said switching part and said operating magnet moves with said operating part a distance which is longer than half the distance moved by the switching magnet but shorter than twice the distance moved by said switching magnet.

5. A magnetically operated switch device as claimed in claim 1, wherein said switching magnet and said operating magnet are spaced from each other.

6. A magnetically operated switch device as claimed in claim 1, wherein said operating magnet and said switching magnet are in abutting relation and said operating magnet slides on said switching magnet, and further comprising plastic material having a low coefficient of friction coating the facing surfaces of each of said magnets.

7. A magnetically operated switch device as claimed in claim 4, wherein said switching part is moved to one of said electrical contacts over a switching path via magnetic forces between said operating magnet and said switching magnet, and further comprising stop means affixed to said operating part for limiting the movement of said operating magnet in a manner whereby there is an attractive force between said operating magnet and said switching magnet when said switching magnet is in either of its switching positions and said attractive force supports the electrical contact pressure.

8. A magnetically operated switch device as claimed in claim 6, further comprising operating magnet support means for supporting said operating magnet for movement toward said switching magnet.

9. A magnetically operated switch device as claimed in claim 8, wherein said support means comprises a leaf spring permitting movement of said operating magnet in the direction of movement of said switching magnet.

10. A magnetically operated switch device as claimed in claim 8, further comprising a backing magnet affixed to the side of said operating magnet facing away from said switching magnet and a cooperating backing magnet having the same polarity as said backing magnet fixedly mounted in operative proximity with said backing magnet.

11. A magnetically operated switch device as claimed in claim 9, wherein said operating magnet is mounted for movement along said leaf spring.

12. A magnetically operated switch device as claimed in claim 10, further comprising an air gap of substantially uniform width between said backing magnet and said cooperating backing magnet, said air gap being inclined at an angle with the direction of movement of said operating magnet.

13. A magnetically operated switch device as claimed in claim 10, wherein said operating magnet and said backing magnet are integrally formed in an integral unit.

14. A magnetically operated switch device as claimed in claim 10, wherein the magnetic poles of each of said switching magnet and said operating magnet are tapered to form substantially V-shaped spaces between adjacent ones of said magnetic poles.

15. A magnetically operated switch device as claimed in claim 12, wherein the surfaces of said backing magnet and said cooperating backing magnet facing each other are included at said angle with the direction of movement of said operating magnet.

References Cited

UNITED STATES PATENTS

| | | | |
|---|---|---|---|
| 2,298,573 | 10/1942 | Little | 335—205 X |
| 3,260,821 | 7/1966 | Yokoo | 335—153 |

FOREIGN PATENTS

| | | |
|---|---|---|
| 1,432,447 | 2/1966 | France. |

BERNARD A. GILHEANY, *Primary Examiner.*

R. N. ENVALL, *Assistant Examiner.*